No. 639,208. Patented Dec. 19, 1899.
J. BUCKLEY.
STRAINER FOR VESSELS.
(Application filed Sept. 17, 1897.)
(No Model.)
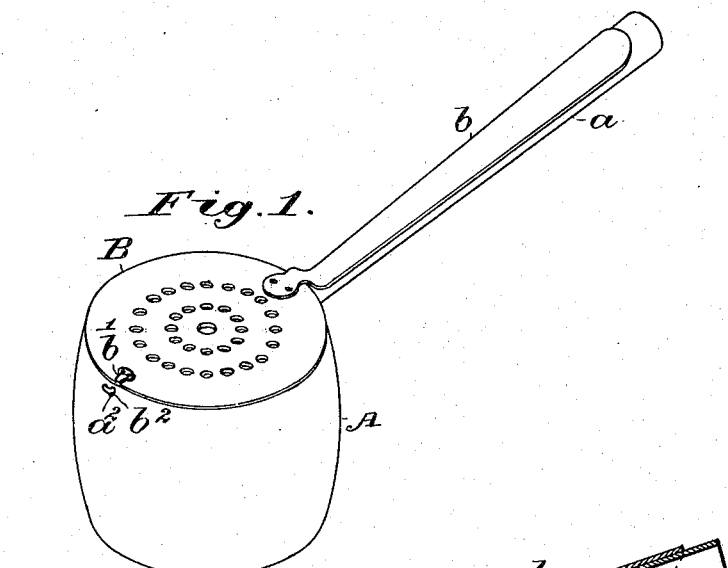
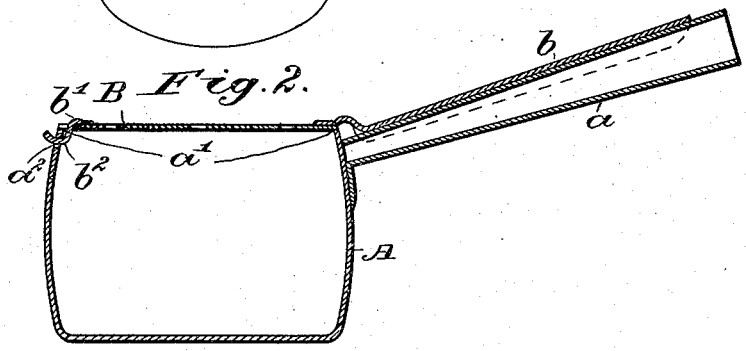
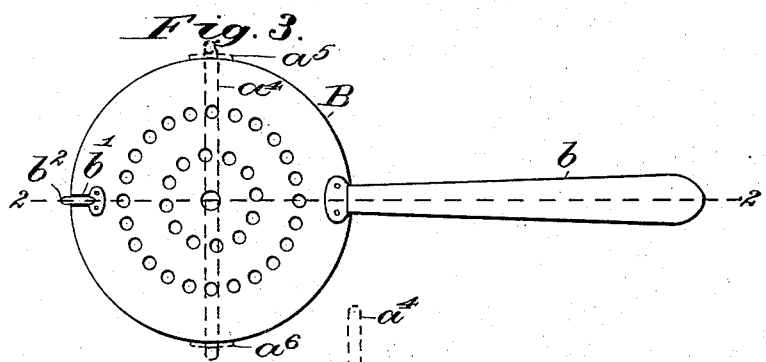
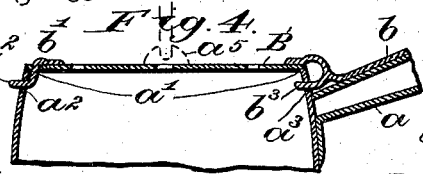
WITNESSES.
Kirkley Hyde.
Lewis F. Longmore
INVENTOR
Joseph Buckley,
By Albert M. Moore,
His ATTORNEY.
THE NORRIS PETERS CO., PHOTO-LITHO., WASHINGTON, D. C.

UNITED STATES PATENT OFFICE.

JOSEPH BUCKLEY, OF BILLERICA, MASSACHUSETTS.

STRAINER FOR VESSELS.

SPECIFICATION forming part of Letters Patent No. 639,208, dated December 19, 1899.

Application filed September 17, 1897. Serial No. 651,995. (No model.)

*To all whom it may concern:*

Be it known that I, JOSEPH BUCKLEY, a subject of Victoria, Queen of the United Kingdom of Great Britain and Ireland, residing at Billerica, township of Billerica, in the county of Middlesex and Commonwealth of Massachusetts, have invented a certain new and useful Improvement in Strainers for Vessels, of which the following is a specification.

This invention relates to strainers for stew-pans, kettles, and other culinary vessels; and it consists in a strainer adapted to fill or cover the mouth of such a vessel and provided with means for engaging the rim portion of such vessel to enable the water to be strained out of vegetables or other solid things contained in such vessel, substantially as hereinafter described and claimed.

In the accompanying drawings, Figure 1 is an isometric perspective view of a stew-pan or long-handled kettle with my improved strainer applied thereto; Fig. 2, a central vertical section of the same on the line 2 2 in Fig. 3; Fig. 3, a plan of the same; Fig. 4, a vertical central section similar to Fig. 2, but showing in addition a projection on the handle adapted to enter a hole in the rim portion of the kettle and showing the kettle provided with a bail or swinging handle.

The kettle or stew-pan A, Figs. 1, 2, and 3, is of ordinary construction, except as hereinafter stated, and is provided with a rigid handle $a$ in the usual manner.

The strainer B is a perforated sheet of a suitable shape to cover or fill the mouth $a'$ of the pan and is provided with a handle $b$, rigidly secured to the plate or body of said strainer, and is also provided with an engaging part, represented as a projection $b'$, secured to said plate diametrically opposite the handle $b$ and reaching below said plate and bent near its lower end at $b^2$ radially outward to enter a hole $a^2$ in the rim portion of the wall of said pan. The handle $b$ should be arranged for convenience at the same angle with the body of the strainer as the handle $a$ makes with the top of the pan A, so that both handles may be grasped by one hand.

After boiling vegetables in the pan the ordinary cover is removed and the strainer is placed on the pan by sliding or hooking the projection into the hole, and the water is strained off by tipping the pan in the usual manner. By this means all danger of scalding the hands by the escaping water and steam is avoided, an accident of frequent occurrence where the attempt is made to strain off the water between the top of the pan and the edge of the ordinary pan-cover.

In Fig. 4 the same letters of reference indicate corresponding parts; but the handle $b$ of the strainer is represented as provided with an additional engaging projection $b^3$, which enters a hole $a^3$, similar to the hole $a^2$ and diametrically opposite said hole $a^2$, thus enabling the strainer to be used, as above described, with a pan having a rigid handle $a$ or having a bail or swinging handle $a^4$, and by arranging the holes $a^2$ $a^3$ in a diametrical line at right angles to that in which the ears $a^5$ $a^6$ of the bail $a^4$ are placed the kettle may be tipped by raising the handle of the strainer.

I claim as my invention—

1. A strainer, having a handle, and having a projection, said handle and projection being rigidly secured to said strainer, at opposite sides thereof, said projections being adapted to enter a hole in the side of a pan or similar vessel provided with a handle and said strainer-handle being arranged to rest upon said vessel-handle and to be grasped by the same hand which holds said vessel-handle.

2. A strainer, having a projection and having a handle, each rigidly secured to said strainer at opposite sides thereof, said handle being also provided with a projection, said projections being adapted to enter holes in opposite sides of a pan or similar vessel having a handle, and said strainer-handle being arranged to rest, when in use, upon the handle of said vessel and to be grasped by the same hand which grasps said vessel-handle.

3. The combination of a pan or similar vessel, having a handle at the side thereof, and having a hole in the side opposite said handle, and a strainer, adapted to cover the mouth of said vessel and having a projection, to enter said hole, and having a handle which in use is parallel with and rests upon said vessel-handle, to enable both of said handles to be grasped by the same hand.

In witness whereof I have signed this specification, in the presence of two attesting witnesses, this 4th day of September, A. D. 1897.

JOSEPH BUCKLEY.

Witnesses:
ALBERT M. MOORE,
LEWIS F. LONGMORE.